(No Model.)

M. J. REUBER, E. G. STONE & P. FUCHS.
CONDENSING APPARATUS.

No. 488,664. Patented Dec. 27, 1892.

Witnesses:

Inventors.
M. J. Reuber
E. G. Stone
Peter Fuchs

UNITED STATES PATENT OFFICE.

MATHIAS J. REUBER AND EDWIN G. STONE, OF PITTSBURG, AND PETER FUCHS, OF LOWER ST. CLAIR, PENNSYLVANIA.

CONDENSING APPARATUS.

SPECIFICATION forming part of Letters Patent No. 488,664, dated December 27, 1892.

Application filed August 7, 1890. Renewed November 22, 1892. Serial No. 452,843. (No model.)

*To all whom it may concern:*

Be it known that we, MATHIAS J. REUBER and EDWIN G. STONE, of Pittsburg, and PETER FUCHS, residing at Lower St. Clair, in the county of Allegheny, State of Pennsylvania, citizens of the United States, have invented certain new and useful Improvements in Condensing Apparatus; and we do hereby declare the following to be a full, clear, and exact description of the invention, such as will enable others skilled in the art to which it pertains to make and use the same, reference being had to the accompanying drawings, which form a part of this specification.

Our invention relates to an improved condensing apparatus, and consists in certain details of construction and combination of parts as will be fully set forth hereinafter.

Figure 1:
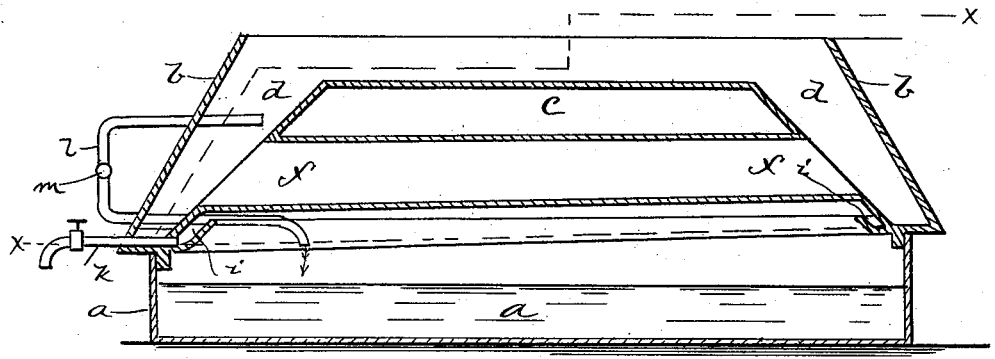
Figure 2:
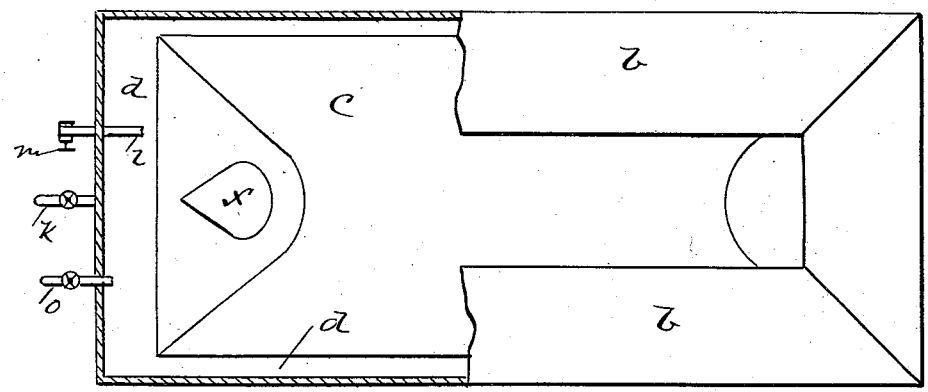
Figure 3:
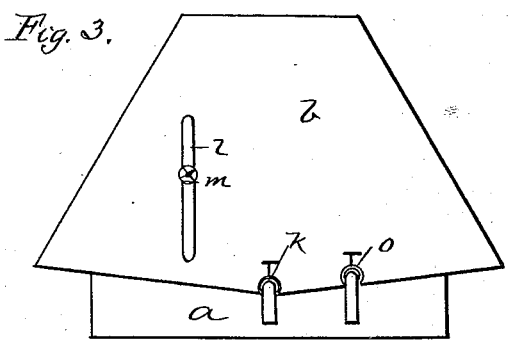
Figure 4:
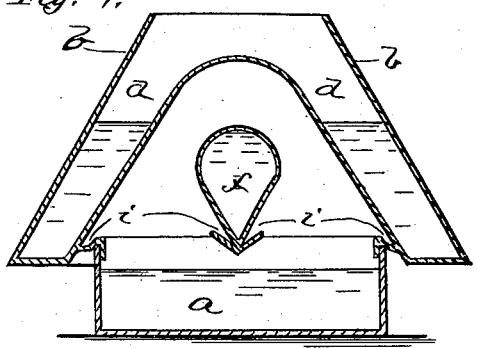

In the accompanying drawings, Figure 1 is a side sectional elevation of our improved condensing apparatus which is constructed in accordance with our invention. Fig. 2 is a plan view of the same partly shown in section, taken on the line $x.x.$ Fig. 3, is an end elevation. Fig. 4, is an end sectional elevation.

To put our invention into practice we provide a pan $a$, of suitable size, capable of containing a quantity of water, and so constructed as to be of a greater depth at the rear than at the front. Placed on the top of this pan $a$, is a tank or receptacle $v$, which has inwardly tapering sides, and is provided with a hollow dome $c$, corresponding to the said tapering sides, and leaving an intervening space $d$, into which a quantity of water is placed for the purpose of keeping the said dome $c$ cool. Formed through this dome $c$, is an opening A, or tube $f$, which is in communication with the space $d$, and will permit the water to enter. Formed about the inner periphery of this dome $c$, and about the lower edges of the opening $f$, are a series of channels or gutters $i$, which are all inclined toward the front of the apparatus and terminate at a point in the front, which is provided with a pipe $k$ for conveying the condensed water to a point or place requiring its use. Leading from the upper water space $d$, is a pipe $l$, provided with a valve $m$, and entering or discharging into the pan $a$, which arrangement will admit of a portion of the water being drained from the upper chamber $d$, into the pan $a$, beneath. A drain cock $o$, located with reference to drain the chamber $d$. provides a means for that purpose.

In operation water is placed in the pan $a$, and into the chamber $d$, and the apparatus placed on a stove or other hot surface. The water in the pan generates steam which condenses on the inner surface of the dome $c$, and on the tube $f$, and flowing downward into the channels $i$, finds its way through the exit pipe $k$, and into a receptacle into which the said pipe $k$ empties.

Having thus described our invention we claim,

1. In a distilling apparatus, substantially as described, the combination of a pan or reservoir $a$, the upper chamber $b$, provided with an internal dome which extends longitudinally of said chamber and out of contact therewith to form an intermediate water space $d$, which extends continuously between the dome $c$ and the wall of the chamber $b$, the longitudinal pipe or tube $f$ arranged within the dome $c$, immediately above the water tank and opening at its ends through the dome to provide for the passage of the water from end to end of the chamber $b$, and the channels situated at the lower edges of the dome and the horizontal tube to receive the water of condensation from the surfaces of said dome and the longitudinal tube, as and for the purpose set forth.

2. In a distilling apparatus, substantially such as herein shown and described, the combination of a water tank or reservoir $a$, the upper chamber $b$, provided with the internal dome $c$ which is arranged within said chamber and out of contact with the walls of the same to form the intermediate chamber $d$ which extends continuously between the ends and sides of the wall of the chamber $b$ and the dome $c$, the inclined channels at the lower edges of the dome $c$, and extending continuously around the same, the longitudinal tube or pipe $f$, extending through the dome $c$ immediately above the water tank and having its ends opening through said dome and communicating with the water chamber d, the inclined conduits or channels below the pipe f and extending to the conduits or channels of the dome c, the pipe l leading from the dome c to the water tank, and the discharge pipe k leading from the inclined conduits, as and for the purpose set forth.

In testimony that we claim the foregoing we hereunto affix our signatures this 12th day of May, A. D. 1890.

MATHIAS J. REUBER. [L. S.]
EDWIN G. STONE.
PETER FUCHS.

In presence of—
CHARLES LARGE,
M. E. HARRISON.